United States Patent [19]

Torborg

[11] Patent Number: 5,454,583
[45] Date of Patent: Oct. 3, 1995

[54] AUTOMATICALLY ADJUSTED REAR AXLE TRACK FOR AGRICULTURAL VEHICLE WITH ADJUSTABLE AXLES

[75] Inventor: David H. Torborg, Eagan, Minn.

[73] Assignee: AG-Chem Equipment Company, Inc., Minnetonka, Minn.

[21] Appl. No.: 240,227

[22] Filed: May 10, 1994

[51] Int. Cl.⁶ .................... B62D 61/00; B60B 35/10; B60B 35/14
[52] U.S. Cl. .................... 280/638; 180/209; 180/906; 301/128
[58] Field of Search .................... 280/638, 95.1; 180/209, 906, 155, 159, 162, 163; 301/128

[56] References Cited

U.S. PATENT DOCUMENTS

| 1,967,283 | 7/1934 | Brown | 180/209 |
| 2,173,419 | 9/1939 | Johnson | 180/906 |
| 4,039,094 | 8/1977 | Grove | 280/638 |
| 4,120,507 | 10/1978 | Miller | 280/95.1 |
| 4,449,600 | 5/1984 | Telfer | 280/638 |
| 4,986,386 | 1/1991 | Iwamoto et al. | 280/638 |
| 5,039,129 | 8/1991 | Balmer | 180/906 |
| 5,121,808 | 6/1992 | Visentini et al. | 280/638 |
| 5,282,644 | 2/1994 | Larson | 280/638 |

FOREIGN PATENT DOCUMENTS

| 61-220902 | 10/1986 | Japan | 180/906 |
| 0301104 | 12/1988 | Japan | 301/128 |
| 0249502 | 10/1989 | Japan | 301/128 |
| 1257669 | 10/1989 | Japan | 180/906 |
| 4201603 | 7/1992 | Japan | 301/128 |

Primary Examiner—Karin L. Tyson
Assistant Examiner—Peter C. English
Attorney, Agent, or Firm—Larkin, Hoffman, Daly & Lindgren, Ltd.

[57] ABSTRACT

A rear axle auto-tracking system automatically ensures that the rear axle follows the front axle on an agricultural vehicle having adjustable front and rear track assemblies. With the auto-tracking system energized, the vehicle operator simply adjusts the front track while driving and the rear axle automatically adjusts to stay in line with the front track within about ±½ inch per side. The system can be turned off to allow independent rear track adjustment. If the system is re-energized while driving, the rear track will quickly adjust to follow the front axle setting. As when adjusting the front track, the vehicle must be moving when adjusting the rear axle track.

17 Claims, 5 Drawing Sheets

REAR AXLE AUTO-TRACK

AUTOMATICALLY ADJUSTED REAR AXLE TRACK FOR AGRICULTURAL VEHICLE WITH ADJUSTABLE AXLES

CROSS REFERENCE TO RELATED APPLICATIONS

This application is related to U.S. Pat. No. 5,282,644 in the name of Larson, entitled "Hydraulically Adjustable Tie Rod for An Agricultural Vehicle with an Adjustable Axle", and also to co-pending U.S. application Ser. No. 08/220,237, to Torborg entitled "Vehicle with Hydraulically Adjustable Tie Rod", both of which are assigned to the Assignee of the present invention.

BACKGROUND OF THE INVENTION

1. Field of the Invention

This invention relates generally to farming row crop applicators having adjustable track widths, and more specifically, to row crop applicators having an automatic rear axle auto track assembly that follows adjustments of front axle track widths.

2. Description of the Prior Art

Row crop applicators are widely used in the farming industry for applying fertilizer about a field to maximize crop yield. Since different crops are planted in rows having free-selected row widths, depending on the crop to be grown, the row crop applicator machinery needs to have adjustable track widths such that the tires of the applicator can be driven in the rows defined between the rows of crop. Typical row crop applicators have a track width adjustable between 120 and 152 inches.

Four wheeled row crop applicators have a front axle steering assembly including a tie rod extending between a pair of steering structures for maintaining a pre-selected toe-in setting. Consequently, when the track width of the steering assembly is adjusted in the longitudinal direction, the length of the tie rod needs to be adjusted in the longitudinal direction in step therewith. Prior art steering axle assemblies are typically adjusted hydraulically. Most tie rods presently available are typically comprised of a rod telescopingly received within tubular member, wherein a set pin can be selectively removed therefrom such that the inner rod member can telescope within the tubular member when the track width is adjusted such as disclosed in U.S. Pat. No. 4,449,600 to Telfer, issued May 22, 1984 entitled "Mobile Cranes or Aerial Lift Platforms". In those systems, one or more set pins are In those systems, one or more set pins are subsequently reinserted through a pair of holes defined in both the tubular member and the telescoping rod to secure the inner rod to the tubular member. These holes are typically defined in 4 inch increments, wherein the operator has to manually insert and remove the pins during the track width adjustment procedure.

Another major problem with prior art equipment is that the toe-in setting defined by the wheel assemblies needs to be reset whenever the track width is established between a minimum and a maximum setting. Further, since the holes in the tie rod assembly are defined every 4 inches, the operator needs to repeatedly fine tune the track width adjustment until the holes of the inner rod and the outer tubular member are perfectly aligned so that the set pin can be disposed therein. The processes are time consuming, tedious and potentially dangerously as the operator needs to be positioned beneath the front of the tractor chassis. Further, the track width of the row crop applicator can only be adjusted in 4 inch increments and is not adjustable in any size increments between a minimum and a maximum. Some crops are planted in rows as narrow as 24 inches, and since the track widths of tractor wheels can sometimes extend up to 12 inches, a 4 inch track width adjustment increment does not provide adequate fine tuning of a desirable track width.

Typically, independent contractors are hired by the farmer to treat a field. The track width of the contractor's row crop applicator is usually not initially appropriate for the intended field to be treated with fertilizer when the contractor arrives to the field. Thus, the independent contractor is required to adjust the track width and reset the toe-in. Treating several different fields in a day may require setting several different track widths, which is time consuming and inefficient. When the independent contractor is under severe time limitations to treat many fields with a fertilizer in a very narrow time window, which can be dictated by the weather or other uncontrollable circumstances, valuable time is lost during the repeated track width adjustments. Thus, the independent contractor stands to benefit from the present invention. However, even the farm owner can benefit from an improved adjustable tie rod arrangement since the typical farmer plants more than one type of crop, each having different row widths. Hence, having a row crop applicator with an adjustable track width would benefit the average farmer as well, where the track width is adjustable in negligible increments between a minimum and a maximum track width.

A row crop applicator with a steering structure having an adjustable track width in any size increments between a minimum and a maximum, wherein a hydraulically adjustable tie rod can be adjusted in any size increments between a minimum and a maximum track width, while driving the machine, in a secure arrangement between a first and a second track width setting and which overcomes many of the attendant disadvantages of existing systems described hereinbefore, is disclosed in the above-referenced U.S. Pat. No. 5,282,644, assigned to the Assignee of the present invention. Yet, another row crop applicator which overcomes even more of the attendant disadvantages of known systems is disclosed in the above-referenced co-pending U.S. patent application Ser. No. 08/220,237, to Torborg. The automatic tie rod assembly disclosed in Torborg allows the operator to adjust the front track on the go without having to mechanically lock the steering structure. This enables the operator to adjust the front track very accurately for crops in rows, even while spraying a field or turning the vehicle.

For all of the existing systems hereinbefore described, it is easy for the operator to see where the front wheels contact the ground, and adjust the track as required to minimize crop damage accordingly. The operator cannot, however, see where the rear tires contact the ground from the cab. This makes adjusting the rear track very difficult, especially when operating in rows. In some of the existing systems, the operator has to either estimate how long a period of time is necessary to continue adjustment of the rear track assembly or stop the machine and get out of the cab to read a decal or physically examine the rear axle assembly adjustments.

The present invention overcomes the attendant disadvantages heretofore described for existing systems by providing a rear axle auto-track system for automatically ensuring that the rear axle follows the front axle on a vehicle such as a row crop applicator having an adjustable track width.

SUMMARY OF THE INVENTION

The disadvantages and limitations of the background art discussed above are overcome by the present invention which includes a rear axle auto-track system for automatically ensuring that a rear axle follows the front axle on a vehicle such as a row crop applicator having a front and a rear track assembly, each assembly having an adjustable track width. With the auto-track system energized, the operator simply adjusts the front track while driving and the rear axle will automatically adjust to stay in line with the front within about ±½ inch per side. The system can be turned off to allow independent rear track adjustment.

If the system is re-energized while driving, the rear track will quickly adjust to follow the front axle setting. As when adjusting the front track, the vehicle must be moving when adjusting the rear axle track.

Moving the front track causes a servo cylinder to move, closing either a normally open or a normally closed switch, thereby energizing a track-out or a trackin solenoid valve section, powering the rear track adjust cylinder, and thereby powering a pair of rear axle follower cylinders which are mechanically linked to the rear axle and sense rear axle position. Hydraulic fluid is exchanged between the servo cylinders and the rear axle follower cylinders and also between the servo cylinders and the front input cylinders in a closed loop hydraulic system, and in a way such that the direction and length of track adjustment for either the left track, right track or both tracks are maintained identically between the front steering track assembly and the rear axle track assembly.

BRIEF DESCRIPTION OF THE DRAWINGS

Other features of the present invention and many of the attendant advantages of the present invention will be readily appreciated as the same becomes better understood by reference to the following detailed description when considered in connection with the accompanying drawings, in which like reference numerals designate like parts throughout the figures thereof, and wherein.

DETAILED DESCRIPTION OF THE PREFERRED EMBODIMENT

A new variable hydraulically adjustable in negligible increments tie rod assembly which an operator to adjust the front track on an agricultural vehicle such as a row crop applicator on the go without having to mechanically lock the steering has been disclosed in hereinbefore referenced co-pending U.S. patent application Ser. No. 08/220,237 to Torborg. That system enables an operator to adjust the front track very accurately for crops in rows, even while spraying the crops or turning the vehicle. It is easy for the operator to see where the front wheels of the vehicle contact the ground and adjust the front track width as required to minimize crop damage.

The operator cannot, however, see where the rear tires contact the ground from the vehicle cab. This makes adjusting the rear track very difficult, especially when operating in rows. The operator has to estimate generally how long to hold the rear track controls and guesstimate where the rear tires are, or, in the alternative, stop the machine to get out and physically examine the rear track assembly.

The present inventive rear axle auto-track system automatically ensures that the rear axle width adjustments follow the front axle width adjustments. With the system energized, the vehicle operator simply adjusts the front track width while driving, and the rear axle width will automatically adjust to stay in line within the front axle width within approximately plus or minus one-half inch per side. The system can be turned off to allow independent rear track adjustment. If the system is re-energized while driving, the rear track width will quickly adjust to follow the front axle setting. As when adjusting the front track, the vehicle must be moving when adjusting the rear axle track.

Figure 1:
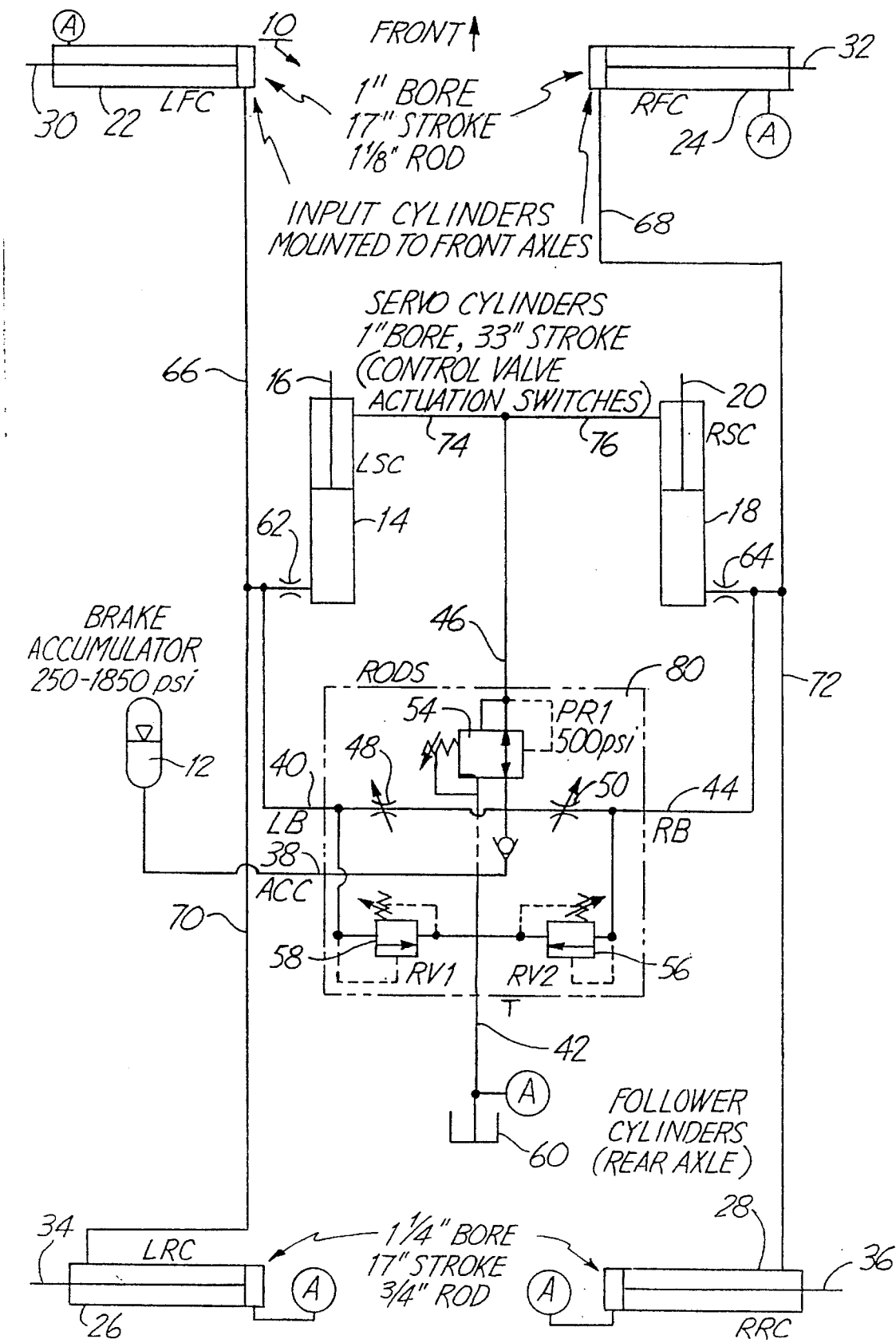
FIG. 1 is a schematic view of the hydraulic rear axle auto-tracking system for compelling extensions and retractions of the rear axle track assembly to identically follow extensions and retractions of the front steering track assembly.
Figure 2:
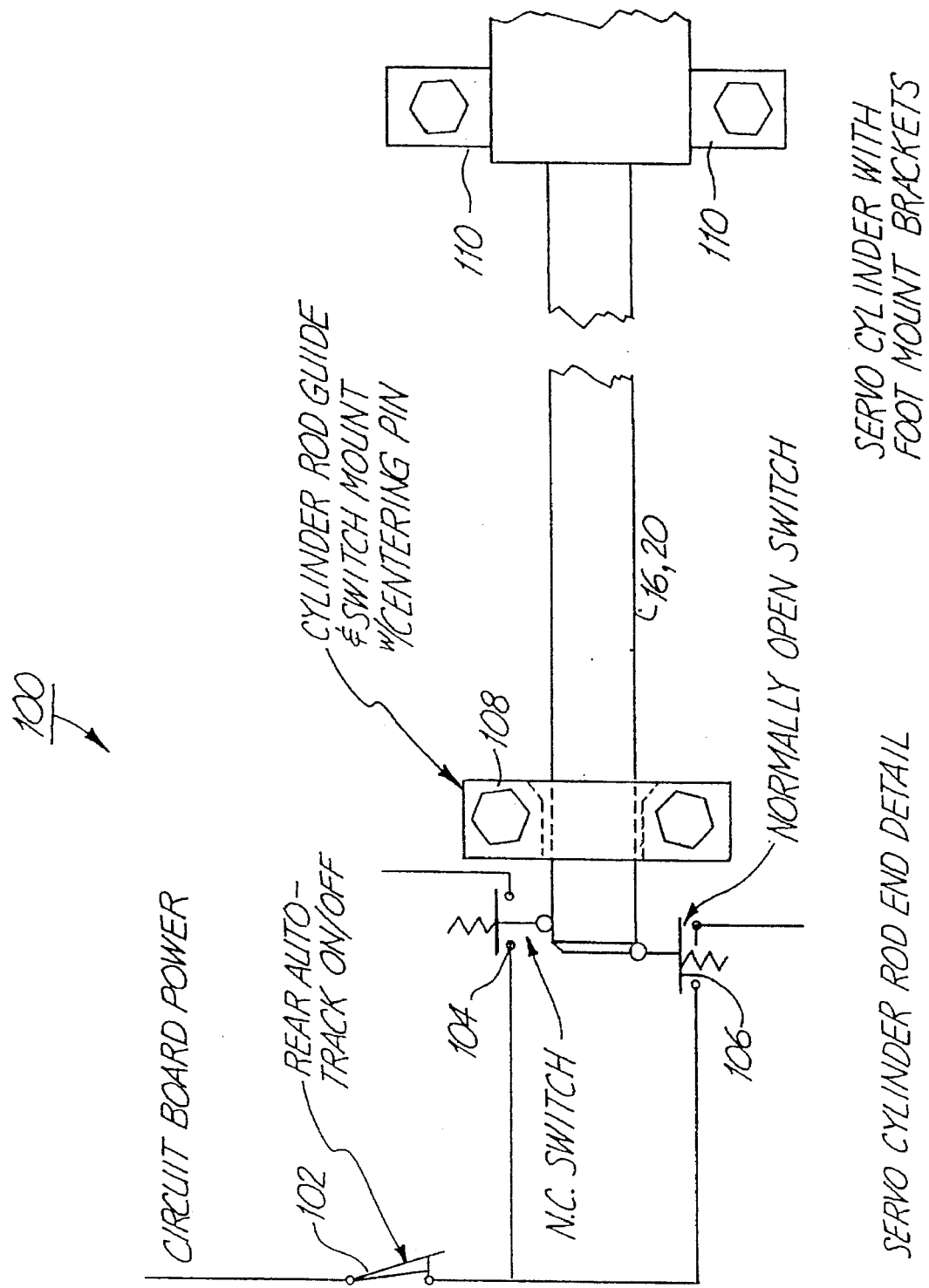
FIG. 2 illustrates the servo cylinder and switch control details for activating and deactivating extension and retraction of the rear axle track adjustment cylinders.
Figure 3:
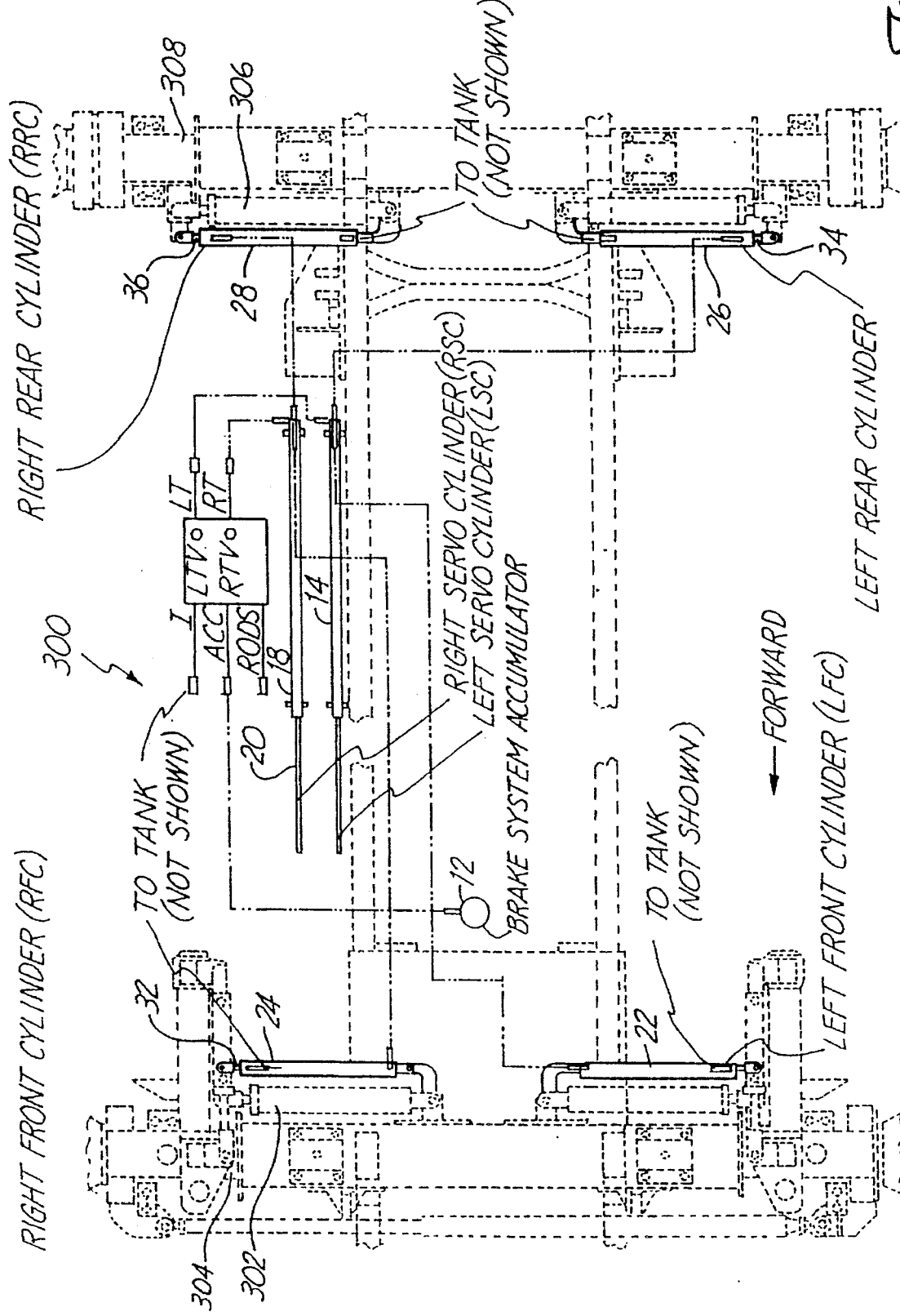
FIG. 3 is a top view of one preferred embodiment of front and rear adjustable track assemblies for an agricultural vehicle incorporating the present inventive rear axle auto-tracking system.

An variable, hydraulically adjustable in negligible increments between a minimum and maximum width front track assembly for an agricultural vehicle which is suitable for use with the present inventive auto-tracking system disclosed in FIGS. 1–3 is disclosed in above-referenced co-pending U.S. patent application Ser. No. 08/220,237 to Torborg and assigned to the Assignee of the present invention. The Torborg application is hereby incorporated herein by reference in its entirety.

Referring to FIG. 1, a schematic diagram of the preferred embodiment of hydraulic system 10 which automatically ensures that the rear axle follows the front axle for an agricultural vehicle having adjustable front and rear axle assemblies is illustrated. Operation of rear axle auto-track hydraulic system 10 will now be described in considerable detail with reference also to FIG. 2 illustrating electrical system 100 depicting the interface details between servo cylinder rods 16, 20 and control switches 104, 106 and also FIG. 3 which shows a top view of the preferred embodiment of the adjustable assemblies.

With the rear axle auto-track hydraulic system 10 power switch 102 shown in FIG. 2 turned to the 'on" position, the rear axle auto-track hydraulic system 10 shown in FIG. 1, operates as follows to vary the rear axle track width. As stated hereinbefore, the rear axle assembly will automatically adjust to stay in line with the front steering axle assembly within about plus or minus one-half inch per side. The rear axle auto-track hydraulic system 10 operates in the same manner for adjustments of either the right hand side of the track assembly or the left hand side of the track assembly 300 illustrated in FIG. 3. Therefore, operation of the rear axle auto-track hydraulic system 10 will be described only for extending and retracting the right hand track for the agricultural vehicle. Because one skilled in the art readily appreciates that the structure of the left hand track is substantially the mirror equivalent of the right hand track, the reference signs corresponding to the left hand track are absent in the detailed description to facilitate describing the operation of the present invention.

When the operator extends the right front track cylinder 302, as described in the Torborg application referenced above, while driving the agricultural vehicle, front right follower cylinder 24 piston rod 32, which is mechanically linked to the front right axle 304 and senses right front track position, is extended. This activity causes hydraulic fluid from a brake system accumulator 12 to flow through the ACC port 38 into the rear track valve assembly 80, through the check valve CV1 (52), through the pressure reducing relieving valve PR1 (54), out of the valve assembly 80 and into the rod end of the right servo cylinder 18. This hydraulic fluid, maintained at about 500 psi by the pressure reducing/relieving valve PR1 (54), forces hydraulic fluid out of the base end of right servo cylinder 18 and into the base end of front right follower cylinder 24 as front right follower cylinder 24 piston rod 32 is extended.

While a specific pressure has been identified as being maintained by the pressure reducing/relieving valve PR1 (54), this is done for the purposes of illustration only, and is not intended to limit the scope of the present invention to a particular pressure. It is believed by the inventor that the selection of a particular pressure which is to be maintained by the pressure reducing/relieving valve PR1 (54), is not critical to the present invention so long as sufficient pressure is maintained to force hydraulic fluid out of the base end of right servo cylinder 18 and into the base end of front right follower cylinder 24 as front right follower cylinder 24 piston rod 32 is extended.

Hydraulic fluid exiting the base end of right servo cylinder 18 allows right servo cylinder 18 piston rod 20 to retract off of a normally centered or "off" position, thereby allowing a normally closed switch S1 (104) shown in FIG. 2 to close, thereby energizing a solenoid valve assembly (not shown) which may be similar to the solenoid valve assembly disclosed in the Torborg application referenced above, and which powers the right rear track adjusting cylinder 306 out. The rear axle auto-track follower cylinder 28 and piston rod 36, which are mechanically linked to the right rear axle 308 and which sense the rear axle position, then extend in unison with the right rear track adjusting cylinder 306.

Extension of right rear axle follower cylinder 28 piston rod 36 causes hydraulic fluid to flow from the rod 36 end of follower cylinder 28 into the base end of the right servo cylinder 18. It is important to note that the piston rod 36 end of the right rear axle 308 follower cylinder 28 has exactly the same area as the base end of right servo cylinder 18 and the right front follower cylinder 24. In the preferred embodiment, the rear axle follower cylinders 26, 28 have 1 ¼ inch bores with a ¾ inch rod 34, 36. Servo cylinders 14, 18 and front left and right follower cylinders 22, 24 have one inch bores. While specific displacements and rod sizes have been identified herein, this is done for the purposes of illustration only, and is not intended to limit the scope of the present invention to particular implementations of these cylinders and rods. It is believed by the inventor that the selection of particular cylinder and piston dimensions are not critical to the present invention so long as the rod end of rear axle follower cylinders 26, 28 have exactly the same area as the base end of servo cylinders 14, 18 and front follower cylinders 22, 24 and provide the necessary means for generating minimal and maximal track width adjustments.

When the rear axle follower cylinder 28 has forced enough hydraulic fluid into the base end of right servo cylinder 18 to cause the right servo cylinder 18 piston rod 20 to open switch S1 (104) shown in FIG. 2, the solenoid valve assembly (not shown) powering the rear track assembly loses power and moves back into the neutral position. At this point, the right rear axle assembly is in line with the front axle assembly.

In like manner, the right rear axle track assembly can be retracted as hereinafter described in detail. When the right front track assembly for the vehicle is retracted, hydraulic fluid flows from the base end of the front right follower cylinder 24, which is then forced into the base end of right servo cylinder 18. Hydraulic fluid from the rod 20 end of the right servo cylinder 18 is then forced back and into the rear auto-track valve assembly 80, causing the PR1 (54) valve shown in FIG. 1 to go into a relief mode which vents the hydraulic fluid out the T-port 42 and into a hydraulic fluid reservoir 60.

Immediately upon right servo cylinder 18 piston rod 20 extending off of the centered or "off" position, normally open switch S2 (106) illustrated in FIG. 2 closes and energizes a solenoid valve assembly referenced above which then retracts the right rear track adjusting cylinder 306. Because rear axle follower cylinder 28 follows the right rear track adjusting cylinder 306, hydraulic fluid from the base end of the right servo cylinder 18 is then forced into the piston rod 36 end of the right rear axle follower cylinder 28 as piston rod 36 retracts. When piston rod 20 for right servo cylinder 18 retracts to the point where switch S2 (106) opens, the solenoid valve assembly (not shown) powering the rear track assembly loses power and changes back to a neutral mode of operation. At this point, the right rear axle assembly is once again in line with the front steering axle assembly.

Figure 4:
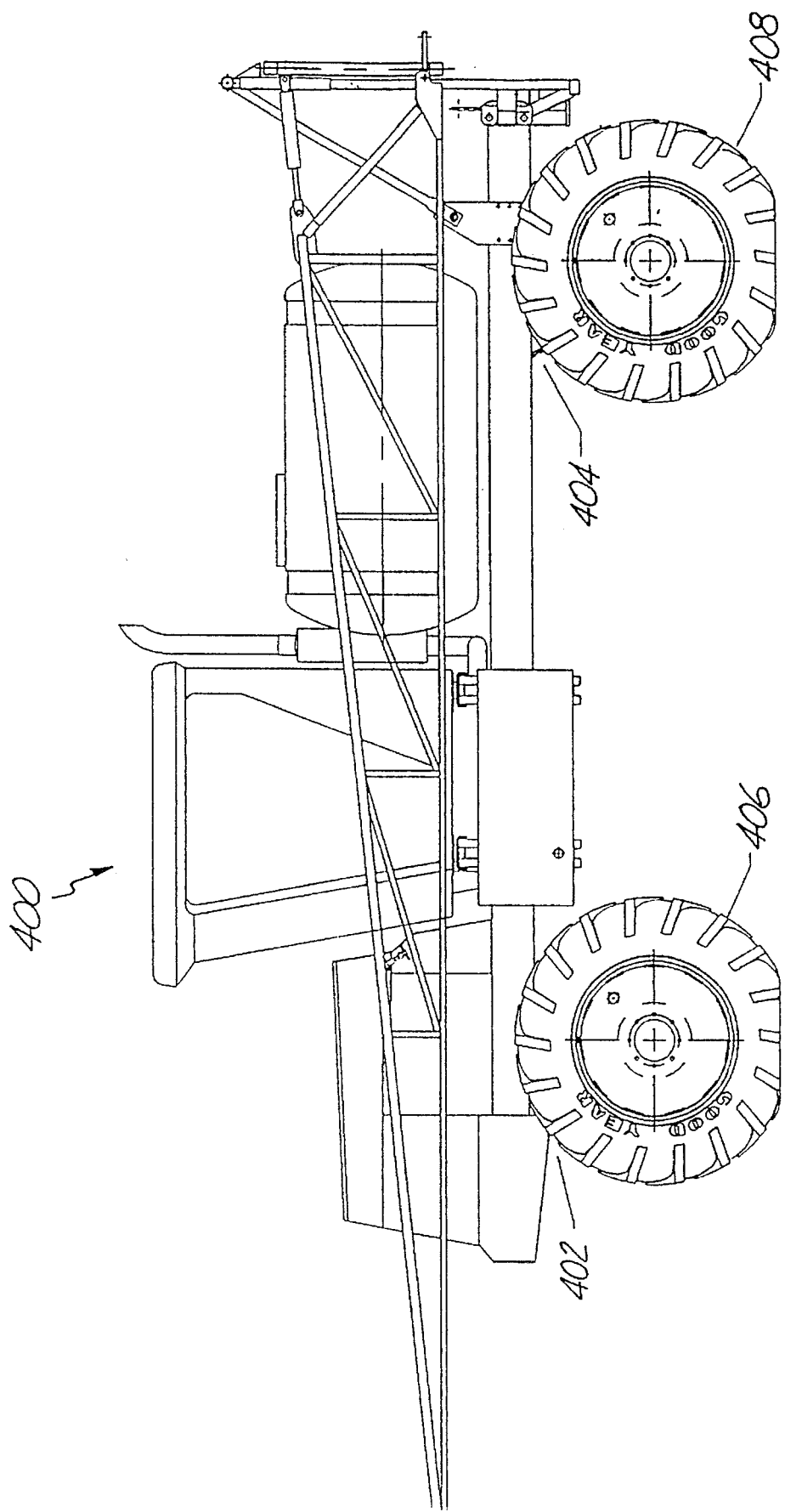
FIG. 4 illustrates a side view of an agricultural vehicle having front and rear axle assemblies with adjustable track widths.

Referring now to FIG. 4, a side view of a typical four wheeled row crop applicator vehicle is generally shown at 400. Vehicle 400 has a front steering axle assembly generally shown at 402, wherein a pair of wheels 406 define a track width. Vehicle 400 further has a rear axle assembly generally shown at 404, wherein a pair of wheels 408 define a second track width. As hereinbefore described, the front steering axle assembly 402 can be adjusted independently of any adjustments made to rear adjustable axle assembly 404. One skilled in the art will recognized that the rear axle assembly 404 may also be steerable, but details of the steerable operation of the rear axle assembly 404 have been omitted for clarity in describing the present invention. In the preferred embodiment, the track width is adjustable between an inner most and outer most position, typically 120 inches to 152 inches. However, limitation to this adjustable track width range is not to be inferred from this particular embodiment.

Figure 5:
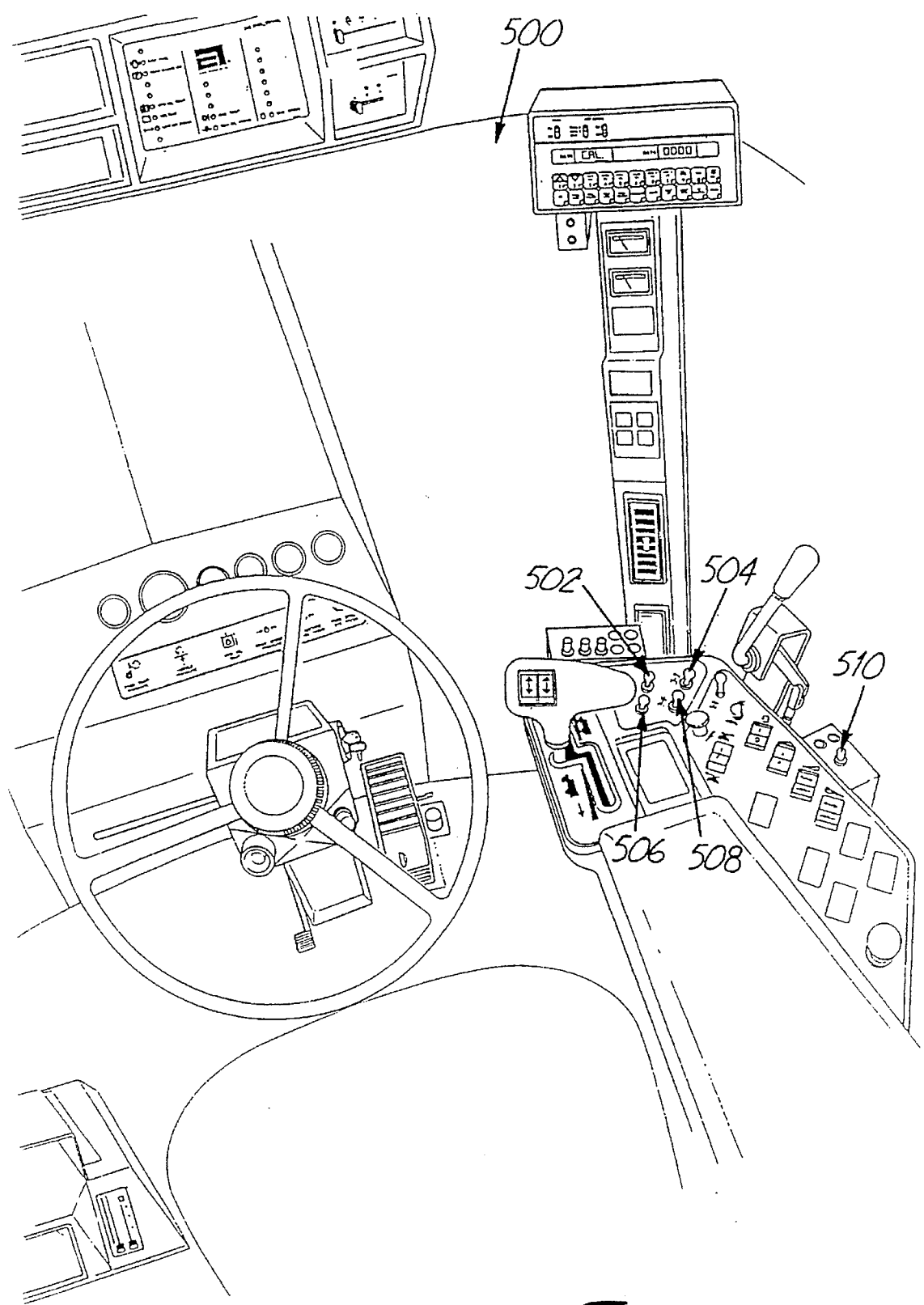
FIG. 5 is a detailed illustration, showing the interior cab operator track width adjusting controls for the vehicle illustrated in FIG. 4.

FIG. 5 illustrates typical operator controls including those for adjusting the from steering axle assembly and the rear axle assembly for the vehicle 400 shown in FIG. 4. The track width defined by each wheel is individually and independently adjustable. For example, switch 502 controls the track width defined by the front left tire for vehicle 400. Switch 504 controls the track width defined by the front right tire for vehicle 400. Switch 506 controls the track width defined by the rear left tire for vehicle 400. Switch 508 controls the track width defined by the rear right tire for vehicle 400. Switch 510 is the main power switch for activating the present inventive rear axle auto-track assembly 10 such that the direction and length of track adjustment for either the left track, right track or both tracks are maintained identically between the front steering track assembly 402 and the rear axle track assembly 404. These controls 502, 504, 506, 508 and 510 have been located for ease of operator use. However, limitations as to both placement of these controls as well as type of control used are not to be inferred from this particular embodiment.

In summary, a rear axle auto-track system 10 has been described in considerable detail, for automatically ensuring that a rear axle follows a front axle on a vehicle such as a row crop applicator having a front and a rear track assembly, each assembly having an independently adjustable track width. With the auto-track system 10 energized, the operator simply adjusts the front track while driving and the rear axle will automatically adjust to stay in line with the front track within approximately ±½ inch per side. The system can be turned off to allow independent rear track adjustment.

The present invention offers a significant advantage to the operators of row crop applicator vehicles by eliminating the necessity for the operator to stop the machine, get out of the cab and physically examine the rear axle assembly adjustments following adjustments made to the track width for the front steering axle assembly.

This invention has been described herein in considerable detail in order to comply with the Patent Statutes and to provide those skilled in the art with the information needed to apply the novel principles and to construct and use such specialized components as are required. However, while a particular embodiment of the present invention has been described herein in detail, it is to be understood that various alterations, modifications and substitutions can be made therein without departing from the spirit and scope of the present invention, as defined in the claims which follow. For example, those skilled in the art will recognize that many of the aspects of the present invention are applicable to other types of vehicles which are designed for agricultural use, such as vehicles used in furrowing around hills in a spiral fashion, as the vehicle moves up and down the hill. Those skilled in the art will also realize that various types of electrical switches, i.e., proximity, can be utilized to activate and deactivate the aforementioned solenoid valve assembly.

I claim:

1. A vehicle, comprising:
   (a) a first axle assembly, having a front right axle assembly and a front left axle assembly, said front left axle assembly being extendible in a longitudinal direction to any position between a first minimum position and a second maximum position, said front right axle assembly being independently extendible from said front left axle assembly in a longitudinal direction to any position between a third minimum position and a fourth maximum position;
   (b) a second axle assembly, having a rear right axle assembly and a rear left axle, said rear left axle assembly being extendible in a longitudinal direction to any position between said first and said second position, said rear right axle assembly being independently extendible from said rear left axle assembly in a longitudinal direction to any position between said third and said fourth position;
   (c) means coupled to said first axle assembly for extending said first axle assembly in the longitudinal direction between said first and said second position and independently between said third and said fourth position, thereby establishing a first track width;
   (d) means coupled to said second axle assembly for extending said second axle assembly in the longitudinal direction between said first and said second position and independently between said third and said fourth position, thereby establishing a second track width; and
   (e) means coupled to said first axle assembly and further coupled to said second axle assembly for controlling said extension of said second axle assembly such that said second track width remains equal to said first track width between said first and said second position and independently between said third and said fourth position.

2. The vehicle as specified in claim 1 wherein said first axle assembly is steerable.

3. The vehicle as specified in claim 2 wherein said second axle assembly is steerable.

4. The vehicle as specified in any one of claims 1, 2 or 3 wherein said first axle assembly extending means comprises at least one axle assembly cylinder having an extendable piston rod axially and slidably disposed therewithin.

5. The vehicle as specified in claim 4 further comprising means coupled to said at least one first axle assembly cylinder for imparting longitudinal movement of said first axle assembly cylinder piston rod.

6. The vehicle as specified in claim 5 wherein said imparting means comprises a hydraulic circuit.

7. The vehicle as specified in any one of claims 1, 2 or 3 wherein said second axle assembly extending means comprises at least one axle assembly cylinder having an extendible piston rod axially and slidably disposed therewithin.

8. The vehicle as specified in claim 7 further comprising means coupled to said at least one second axle assembly cylinder for imparting longitudinal movement of said second axle assembly cylinder piston rod.

9. The vehicle as specified in claim 7 wherein said imparting means comprises a hydraulic circuit.

10. The vehicle as specified in any one of claims 1, 2 or 3 further comprising means for disengaging said controlling means such that said extension of said second axle assembly remains independent of said extension of said first axle assembly whereby said second track width is not compelled to remain equal to said first track width.

11. The vehicle as specified in any one of claims 1, 2 or 3 wherein said controlling means comprises at least one servo cylinder having an extendable piston rod axially and slidably disposed therewithin.

12. The vehicle as specified in claim 11 wherein said controlling means further comprises a first switching means for initiating an increase in said second track width.

13. The vehicle as specified in claim 12 wherein said controlling means further comprises a second switching means for initiating a decrease in said second track width.

14. The vehicle as specified in claim 13 wherein said first switching means comprises a normally closed switch.

15. The vehicle as specified in claim 14 wherein said second switching means comprises a normally open switch.

16. A method of adjusting a track on a vehicle having an engine, a hydraulically adjustable first axle assembly, said first axle assembly being adjustable to any position between a first minimum position and a second maximum position, a hydraulically adjustable second axle assembly, said second axle assembly being adjustable to any position between said first position and said second position, a left and right first axle assembly control mechanism for regulating a left and right track position for said vehicle and a hydraulic second axle auto-tracking system, which comprises:
   (a) starting said vehicle engine;
   (b) while said engine is running, starting said vehicle moving;
   (c) activating said hydraulic second axle auto-tracking system;
   (d) while said vehicle is in motion and said auto-tracking system is activated, activating said left first axle assembly control mechanism while said right first axle assembly control mechanism is deactivated, until a desired left track position is obtained; and (e) while said vehicle is in motion and said auto-tracking system is activated, activating said right first axle assembly control mechanism while said left first axle assembly control mechanism is deactivated, until a desired right track position is obtained.

17. A method of operating a hydraulic circuit for adjusting an axle assembly track width on a vehicle having at least one first axle assembly track adjust cylinder, at least one second axle assembly track adjust cylinder, at least one first axle assembly hydraulic follower cylinder, at least one second axle assembly hydraulic follower cylinder, at least one hydraulic servo cylinder including an adjustable cylinder rod axially and slidable disposed therewithin, said cylinder rod being adjustable to any position between a first minimum position and a second maximum position, a second axle solenoid valve assembly, and a solenoid valve assembly controlling means coupled to said servo cylinder rod, comprising the steps of:

(a) adjusting said at least one first axle assembly track adjust cylinder such that a hydraulic fluid is expelled from said at least one first axle assembly follower cylinder;

(b) directing said hydraulic fluid expelled from said at least one first axle assembly follower cylinder into a first end of said at least one servo cylinder such that a hydraulic fluid is expelled from a second end of said at least one servo cylinder and such that said servo cylinder rod is compelled to move from a preset position whereby said controlling means activates said solenoid valve assembly thereby compelling said at least one second axle assembly track adjust cylinder to adjust such that a hydraulic fluid is expelled from said at least one second axle assembly follower cylinder; and (c) directing said hydraulic fluid expelled from said at least one second axle assembly follower cylinder into said second end of said at least one servo cylinder such that a hydraulic fluid is expelled from said first end of said at least one servo cylinder and such that said servo cylinder rod is compelled to return to said preset position whereby said controlling means deactivates said solenoid valve assembly thereby compelling said at least one second axle assembly track adjust cylinder to stop adjusting.

* * * * *